United States Patent
Ram

(10) Patent No.: US 10,205,626 B2
(45) Date of Patent: Feb. 12, 2019

(54) SYSTEMS AND METHODS FOR ONLINE PURCHASES OF INTEGRATED SERVICES

(71) Applicant: International Business Machines Corporation, Armonk, NY (US)

(72) Inventor: Roni Ram, Yoqneam Illit (IL)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 14/583,815

(22) Filed: Dec. 29, 2014

(65) Prior Publication Data

US 2016/0191297 A1    Jun. 30, 2016

(51) Int. Cl.
*H04L 12/24* (2006.01)
*H04L 12/28* (2006.01)

(52) U.S. Cl.
CPC ...... *H04L 41/0213* (2013.01); *H04L 12/2803* (2013.01); *H04L 12/2807* (2013.01); *H04L 12/2809* (2013.01); *H04L 12/2821* (2013.01); *H04L 41/14* (2013.01); *H04L 41/5058* (2013.01); *Y04S 20/227* (2013.01); *Y04S 20/228* (2013.01)

(58) Field of Classification Search
CPC ............ H04L 12/2803; H04L 12/2807; H04L 12/2809; H04L 12/2821; H04L 41/0213; H04L 41/14; H04L 41/5058; Y04S 20/227; Y04S 20/228
See application file for complete search history.

(56) References Cited

U.S. PATENT DOCUMENTS

| 7,343,325 B2 | 3/2008 | Shaver et al. |
| 7,739,204 B1 | 6/2010 | Cranner et al. |
| 8,209,220 B2 | 6/2012 | Mohammed et al. |
| 2011/0137667 A1* | 6/2011 | Faragoi, Jr. ............ G06Q 10/06 705/1.1 |
| 2013/0006747 A1 | 1/2013 | Wu |
| 2013/0073352 A1 | 3/2013 | Perkins et al. |

(Continued)

OTHER PUBLICATIONS

Scott Fay ., "Probabilistic goods: a creative way of selling products and services", Marketing Science, vol. 27, No. 4, Jul.-Aug. 2008, pp. 674-690.

*Primary Examiner* — Gil H. Lee

(57) ABSTRACT

There is provided a method for component correlation of an integrated service, comprising: receiving, at a central server, a selection of a certain integrated service including hardware and software components, each respective integrated service associated with an offering inventory representation including a description of the hardware and software components; receiving, from the client, a message including the inventory description of the automated home environment; correlating the inventory description of the home inventory with the certain integrated service offering inventory, to identify a subset of hardware and software components already installed within the automated home environment that correspond to hardware and software components of the certain integrated service, wherein the inventory description and the offering inventory are based on a common data format; and presenting, to the client, a modified version of the certain integrated service based on the identified subset.

20 Claims, 3 Drawing Sheets

(56) References Cited

U.S. PATENT DOCUMENTS

| | | | |
|---|---|---|---|
| 2013/0191755 A1* | 7/2013 | Balog | H04L 41/0806 715/735 |
| 2014/0136308 A1 | 5/2014 | Gopalan | |
| 2014/0376528 A1* | 12/2014 | Madonna | H05B 37/0272 370/338 |
| 2015/0198938 A1* | 7/2015 | Steele | G05B 15/02 700/275 |
| 2015/0347683 A1* | 12/2015 | Ansari | H04L 63/08 726/7 |
| 2016/0148099 A1* | 5/2016 | Micali | G06N 5/04 706/11 |

* cited by examiner

SYSTEMS AND METHODS FOR ONLINE PURCHASES OF INTEGRATED SERVICES

BACKGROUND

The present invention, in some embodiments thereof, relates to systems and methods for automatic analysis of a home environment and, more specifically, but not exclusively, to systems and methods for automatic analysis of hardware and software components installed within a home environment.

Integrated services are a new era of services that combine hardware, software and human resources into a single offering. The hardware portion includes a set of devices that communicate with each other and may embed other sub-devices like actuators or sensors. The software artifacts add logic into the hardware which enables communication, reasoning, sensing and actuating features. The human resources are the portion that is responsible for the operation of the service as a whole or for part of the features. The spectrum of integrated services is designed to address diverse solutions for different needs.

SUMMARY

According to an aspect of some embodiments of the present invention there is provided a computer implemented method for component correlation of an integrated service, comprising: receiving, at a central server, a selection of a certain integrated service from multiple integrated services, each respective integrated service including hardware and software components, each respective integrated service associated with an offering inventory representation including a description of the hardware and software components; transmitting, from the central server to a client of an automated home environment, a request for an inventory representation including a description of hardware and software components included in the automated home environment; receiving, from the client, a message including the inventory description of the automated home environment; correlating the inventory description of the home inventory with the certain integrated service offering inventory, to identify a subset of hardware and software components already installed within the automated home environment that correspond to hardware and software components of the certain integrated service, wherein the inventory description and the offering inventory are based on a common data format; and presenting, to the client, a modified version of the certain integrated service based on the identified subset.

Optionally, the hardware and software components installed within the automated home environment are provided by one or more vendors that is different than the one or more vendors providing the hardware and software components of the certain integrated service.

Optionally, identifying comprises identifying the subset of hardware and software components of the certain integrated service that interfere with functionality of the correlated hardware and software components installed within the automated home environment, when the identified subset is installed within the automated home environment.

Optionally, identifying comprises identifying the subset based on similar functionality provided by the components of the certain integrated service offering already existing in the automated home environment, based on a similarity threshold that defines a level of similarity between the functions offered by the respective components.

Optionally, the method further comprises transmitting from the server to the client, the modified version of the certain integrated service without the identified subset; and locally installing the modified version for execution within the automated home environment using hardware and software components already installed within the automated home environment that correspond to non-purchased hardware and software components of the certain integrated service.

Optionally, the inventory description further includes a description of manual human resource based services related to the automated home environment, the offering inventory further includes a description of manual human resource based services of the certain integrated service, and the identified subset includes manual human resources of the certain integrated service already offered in relation to the automated home environment.

Optionally, the method further comprises one or more of: calculating a discount off from a price of the certain integrated service, based on a set of rules, for purchase of the certain integrated service without the identified subset, and calculating a price of the certain integrated service when certain components are offered as upgrades instead of a new component.

According to an aspect of some embodiments of the present invention there is provided a system for component correlation of an integrated service, comprising: a central server connected to a network, the central server configured to: receive, from a client of an automated home environment, a selection of a certain integrated service from multiple integrated services, each respective integrated service including hardware and software components, each respective integrated service associated with an offering inventory representation including a description of the hardware and software components; transmit to the respective client, a request for an inventory representation including a description of hardware and software components included in the respective automated home environment; receive, from the client, a message including the inventory description of the automated home environment; analyze the inventory description of the home inventory by correlating with the certain integrated service inventory, to identify a subset of hardware and software components of the certain integrated service already installed within the automated home environment; and present, to the client, a modified version of the certain integrated service based on the identified subset.

Optionally, the automated home environment includes an application platform that includes multiple different and interconnected runtime execution environments, each runtime environment including multiple standalone hardware and software components.

Optionally, the modified version is presented one or more of: without the identified subset, and offering upgrades to existing components instead of new components.

Optionally, the inventory description and each offering inventory are defined in a respective format for human readability and automated readability.

Optionally, the inventory description includes the distribution of the hardware and software component at different network nodes in a network of the automated home environment, and each respective offering inventory includes a deployment topology for the respective hardware and software components.

Optionally, the central server is an online store.

Optionally, the client has stored thereon a client module configured to explore the automated home environment to discover installed hardware and software, and generate the inventory description by analyzing the discovered hardware and software. Optionally, the client module is configured to operate at a low level to discover hardware and software components that are not discoverable using standard network exploring user interfaces designed for manual use by a user.

Optionally, the central server is further configured to analyze details of each of the integrated services to automatically generate the respective offering inventory.

Optionally, the inventory description and the offering inventory represent the respective hardware and software components independently of associated vendors.

Optionally, one or more of the hardware and software components of the automated home environment are inaccessible directly to a user of the automated home environment.

Optionally, the inventory description and the offering inventory are defined by one or more members of the group consisting of: a documentation folder including documentation, a license folder including licenses, a software folder including software modules, and a configuration folder including a description of the integrated service or home installed services including components, requirements and capabilities.

According to an aspect of some embodiments of the present invention there is provided a computer program product for component correlation of an integrated service, comprising: one or more non-transitory computer-readable storage mediums, and program instructions stored on one or more of the one or more storage mediums, the program instructions comprising: program instructions to receive, at a central server, a selection of a certain integrated service from multiple integrated services, each respective integrated service including hardware and software components, each respective integrated service associated with an offering inventory representation including a description of the hardware and software components; program instructions to transmit, from the central server to a client of an automated home environment, a request for an inventory representation including a description of hardware and software components included in the automated home environment; program instructions to receive, from the client, a message including the inventory description of the automated home environment; program instructions to correlate the inventory description of the home inventory with the certain integrated service offering inventory, to identify a subset of hardware and software components already installed within the automated home environment that correspond to hardware and software components of the certain integrated service, wherein the inventory description and the offering inventory are based on a common data format; and program instructions to present, to the client, a modified version of the certain integrated service without the identified subset.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
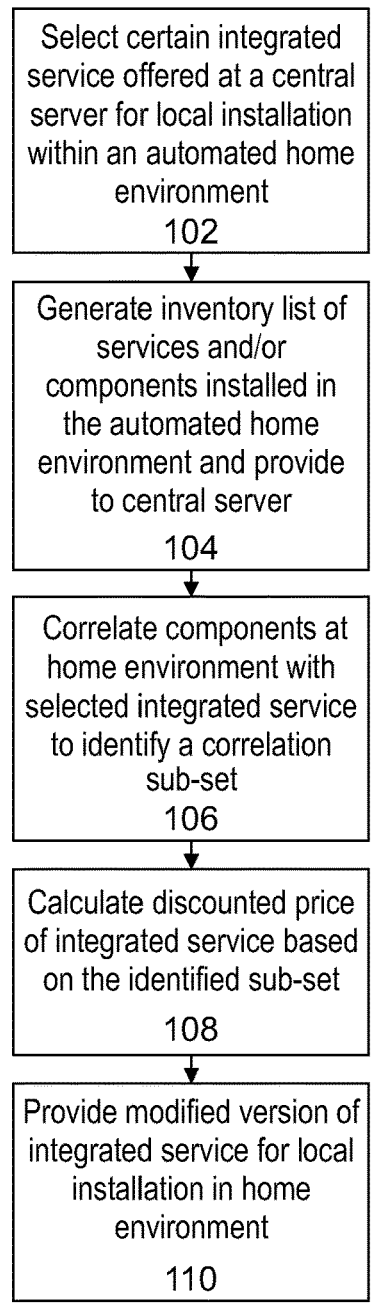
FIG. 1 is a flowchart of a computer implemented method for modifying an integrated service offering based on identified correlated components already existing within an automated home environment, in accordance with some embodiments of the present invention.

The present invention, in some embodiments thereof, relates to systems and methods for automatic analysis of a home environment and, more specifically, but not exclusively, to systems and methods for automatic analysis of hardware and software components installed within a home environment.

An aspect of some embodiments of the present invention relates to systems and/or methods for correlating hardware and software installed within an automated home environment with a certain integrated service offering, to identify a subset of hardware and software components already installed within the automated home environment. Some of the hardware and software components in the home environment may be associated with different vendors than the vendor offering the integrated service. Some of the existing components may be from the same vendor offering the integrated service. A modified version of the integrated service offering based on the identified subset is presented for installation in the automated home environment. The modified version may be presented without the identified subset, for example, when the identified subset includes correlated existing components. The modified version may be the integrated service modified based on the identified subset, for example, when the identified subset includes similar components and the offering is modified to include upgrades to the existing components. The systems and/or methods remove redundant components from the integrated service offering. Existing components in the home environment may be re-used with the integrated service.

Optionally, the price of the integrated service is dynamically discounted based on the identified subset of hardware and software components, to reflect the price of the remaining components without the identified components.

Optionally, the automated home environment and/or the integrated service offering include one or more manual components based on human resources. Manual components associated with the automated home environment are correlated with the integrated service offering to identify the subset of existing manual components that are removed from the modified integrated service offering.

Optionally, the hardware and software and optional manual components of the automated home environment are automatically represented within a predefined inventory data structure. The components of each integrated service offering are automatically represented based on a similar inventory data structure. The inventory data structure defines the components in a generic manner, independently of the original vendor. The common inventory data structure allows comparison and/or correlation between the components of the automated home environment with the integrated service offering, to identify the subset.

Optionally, the correlation is based on identifying hardware and software components (and optional manual components) within the integrated service offering that when installed within the automated home environment interfere and/or conflict with already installed hardware and software components of the automated home environment, for example, transmission within the same frequency band, devices requiring installation within the same physical location, monitoring of the same output, and utilization of the same computing resources. Alternatively or additionally, the correlation is based on identifying similar functionality that may be provided by one or more components of the service offering already existing in the automated home environment, for example, based on a similarity threshold that defines a level of similarity between the functions offered by the components. Local installation of the subset instead of complete installation of the integrated service prevents or reduces the interference and/or conflicts.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As defined herein, the term integrated service means a service composed of hardware components, software components, and optionally human resource based components (i.e., manual), combined to deliver a service to improve the life of people within a home environment. The hardware and software are installed within an automated home environment. Integrated services may be, for example, in the tracking domain, healthcare domain, nutrition domain, and energy consumption domain. For example: the service is designed for tracking and notifying in emergency cases when a person is outside home. Such services allow caregivers to continuously monitor the location of the person and be informed in case the person leaves a predefined zone. In another example, the service is designed for home-based diagnostic, monitoring and consultancy by formal caregivers. In yet another example, the service is designed to control, influence and/or monitor the nutritional habits of a person with the supervision of a nutritionist. In still yet another example, the service is designed to encourage energy saving by changing human behavioral patterns and utilizing sources of energy effectively. The service may be based on a game in which the users get points and can compare themselves against others.

Figure 2:
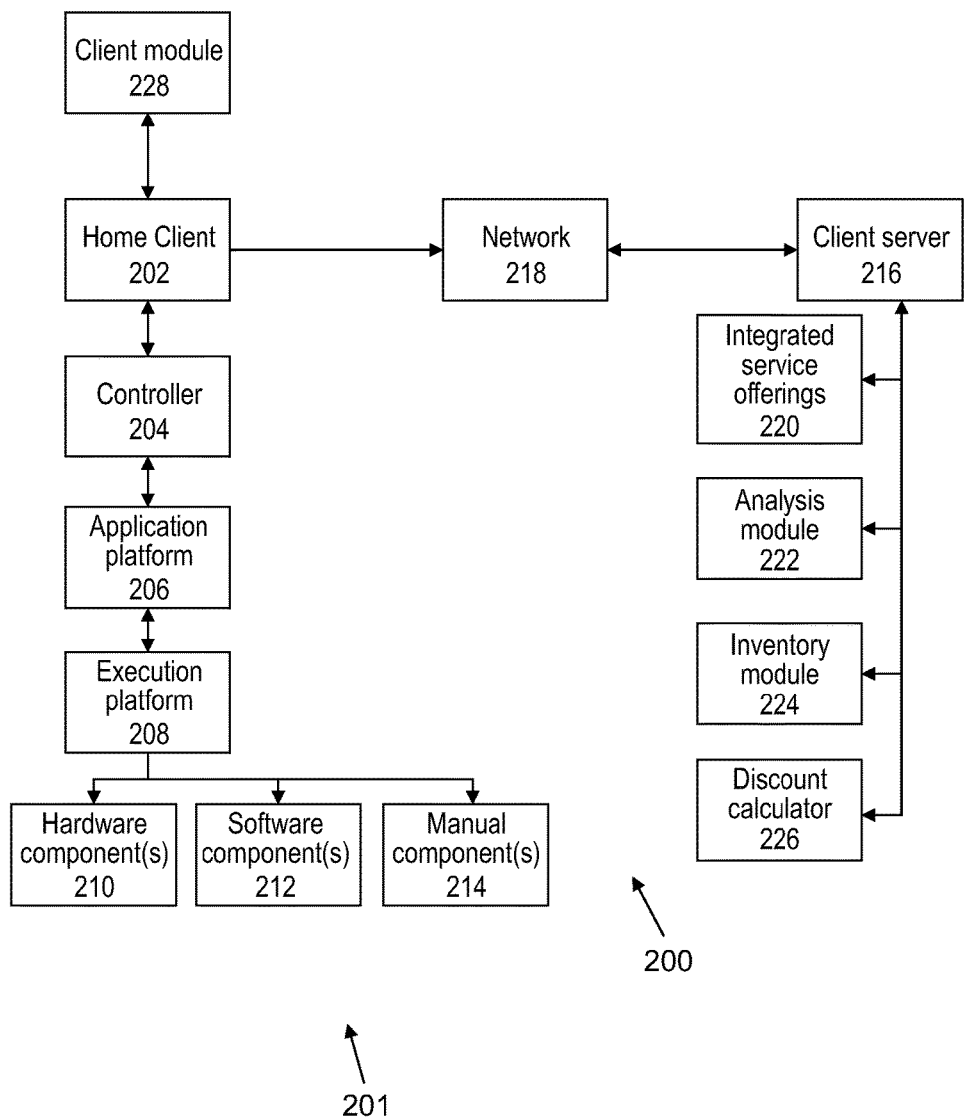
FIG. 2 is a block diagram of a system for modifying an integrated service offering based on identified correlated components already existing within an automated home environment, in accordance with some embodiments of the present invention.

Reference is now made to FIG. 1, which is a flowchart of a computer implemented method for modifying an integrated service offering based on identified correlated components already existing within an automated home environment, in accordance with some embodiments of the present invention. Reference is also made to FIG. 2, which is a block diagram of a system modifying an integrated service offering based on identified correlated components already existing within an automated home environment, in accordance with some embodiments of the present invention. The system of FIG. 2 may execute the method of FIG. 1. The system and/or method identify existing components within an automated home environment, and present a modified integrated service offering by removing the identified existing components from the original complete integrated service offering. The price of the modified integrated service offering may be discounted to reflect the absence of the identified components. Existing components of the home environment may be integrated for re-use with the integrated service in place of the removed components.

The system and/or method prevent or reduce interference, resource competition, and/or conflicts in the automated home environment, by preventing installation of components that are similar to components already installed in the home environment.

The system and/or method provide a common data format that allows correlating and/or comparing between components installed in the home environment and components offered as part of the integrated service offering. The common data format allows correlating and/or comparing the components in a generic manner, independently of the vendor of each component.

The system and/or method may automatically generate the inventory data structure for the automated home environment to include all (or a selected subset, for example, based on a set of rules) hardware and/or software and/or human resource components that the user may be unaware of, for example, hardware and/or software components of devices that not directly accessible for the user through home client 202. Such components may be sub-components that do not appear as network nodes, and/or cannot be directly controlled by the user through a user interface. Such sub-components may be visible and/or accessible through low level programs that automatically identify the components, as described herein. As such, the user who is selecting the integrated service would not necessarily be able to manually identify using standard tools (e.g., a network map through the operating system) which hardware and software components are installed within his/her automated home environment to manually request that corresponding components be removed from the integrated service offering.

System 200 includes an automated home environment 201, which includes multiple interconnected devices, hardware, and software installed in a home (or other facility and/or physical structure) that interact together to provide the runtime environment for the integrated services, for example, to users living in the home. Home environment 201 includes a home client 202, which includes or is in communication with a controller 204 running a central application platform module 206 to control and/or coordinate between multiple runtime execution platforms 208. Each execution platform controls and/or coordinates between multiple components, including hardware 210, software 212, and optionally manual components 214, to provide one or more functions. Examples of hardware 210 include sensors, medical devices, monitoring devices, and computers designed for particular functions. Examples of software 212 include logic added to the hardware components, logic processing based on data received from outputs of the hardware, and/or higher level abstract functionality based on outputs from other software modules, to provide functions, for example, communication, reasoning, sensing, and actuating. Examples of manual components 214 include operating, monitoring, human data analysis, decision making, and/or coordination of the service as a whole or in part. Each respective runtime execution platform 208 may be a standalone platform, which may operate independently of other execution platforms. The functions from the different execution platforms may be run independently, coordinated, integrated, and/or combined by application platform 206.

Home client 202 connects with a central server 216 (e.g., online store) through a network 218 to obtain (e.g., purchase) one or more integrated service offerings 220, for example, tracking a person in the home, healthcare of the person in the home, nutrition of the person in the home, and energy consumption in the home. A certain purchased offering may be delivered to the automated home environment, for example, by transmitting software over network 218 for installation, physically delivering purchased hardware components, and arranging the human resources for the manual component.

At 102, home client 202 contacts server 216 over network 218. For example, a user uses a web browser to browse a webpage hosted on server 216. Server 216, which may be, for example, an online store, a free-ware distribution center, and/or a software manufacturer site for upgrades, includes multiple integrated service offerings available for download and local installation. The integrated service offerings may be available for free, or based on a certain payment model.

The user selects the integrated services for installation within automated home environment 201 using home client 202, for example, purchase of the integrated service, or a free upgrade.

A selection of a certain integrated service from the available integrated services is received at server 216, for example, the user uses the web browser to make an electronic purchase initiated from home client 202.

The integrated service offering may be offered for installation as a standalone service added to the automated home environment, as an upgrade to existing components in the home environment, and/or as additional features to already existing components and/or services at the home environment.

At 104, a message including an inventory description of installed services and/or components of automated home environment 201 is transmitted from home client 202 to central server 216.

Optionally, the message is delivered to server 216 in response to a request message transmitted from server 216 to home client 202 to provide the inventory description.

The inventory description includes representations of the hardware, software and optionally the manual components existing within automated home environment 201. Optionally, the inventory description includes the distribution of the hardware and software component at different network nodes in the network of the automated home environment. The distribution may include the association of hardware and software components with respective execution platforms, and/or the interconnection of hardware and software components.

The inventory descriptions may be defined, for example, based on a text document, for example, an Extensible Markup Language (XML) file. The transmitted message includes the text file. The text file may be automatically processed by server 216. The text based representation is generic, where components are represented in a similar manner independently of the vendor, for example, based on function of the component, for example, heart rate sensor, fall monitoring software, and manual service to call a doctor when an irregular heart rate is detected. The format may be formatted for both human readability and automated readability. In this manner, the inventory may be read by a human and/or processed by other applications.

The inventory description may be automatically generated by a client module 228 that automatically explores the automated home environment to discover existing and/or installed hardware and software components. Client module 228 may operate at a low level to discover hardware and software components that are not discoverable and/or visible using standard network exploring user interfaces designed for manual use by a user, for example, sub-components within a standalone device. The client module may explore the home environment to automatically identify manual services associated with the automated home environment, for example, by locating and/or analyzing service contract files, service descriptions, and operation instructions.

Client module 228 automatically generates the inventory description by analyzing the discovered hardware, software and optional manual components. For example, client module 228 may utilize a statistical classifier to categorize the component using data associated with the component. Client module 228 represents the components using the data structure described herein.

Client module 228 may reside at home client 202, may be downloaded from server 216 (or another remote location) for local installation at home client 202, and/or residing at server 216 and operating remotely at home client 202 over network 218 when permission is granted.

Figure 3:
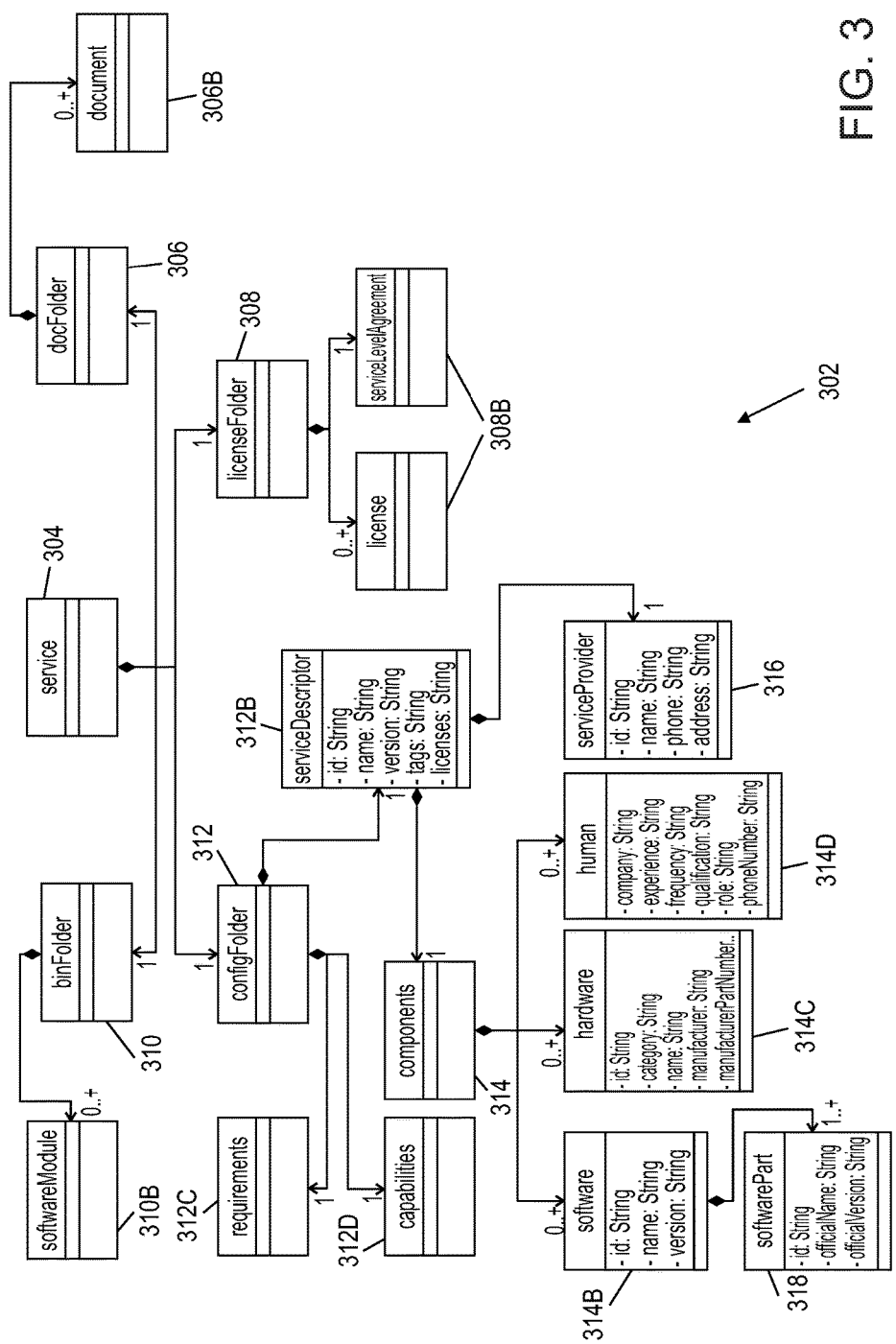
FIG. 3 is an example of a model for an integrated service data structure, in accordance with some embodiments of the present invention.

Reference is now made to FIG. 3, which is a schematic diagram of a model for an integrated service data structure 302 representing hardware, software, and optional manual components, in accordance with some embodiments of the present invention. Data structure 302 includes folder representations for the different components. Optionally, data structure 302 stores additional details related to the integrated service or the services installed at the automated home environment. Inventory data structure 302 may be represented, for examples, as an XML file.

Inventory representation of the home environment is generated for components installed within the automated home environment based on inventory data structure 302, as described herein. Inventory representation of the certain integrated service offering is generated for components included within the integrated service offering based on the inventory data structure 302, as described herein. The inventory of the home environment is correlated with the inventory of the certain integrated service offering to identify a sub-set of correlated components already existing at the home environment. Optionally, the correlation is performed for each folder, to identify correlated components for each folder. The per-folder correlation may improve correlation accuracy and/or performance, for example, the correlation may proceed using parallel processing methods and/or hardware by independently correlating folders.

Inventory data structure 302 is described herein in a generic manner that defines both the certain integrated service offering (when structure 302 is used to define the offering inventory) and the components within the automated home environment (when structure 302 is used to define the home inventory).

Inventory data structure 302 includes a root service 304, which includes one or more of: a documentation 306 folder including documentation 306B related to the integrated service(s) and/or components, a license folder 308 including licenses 308B related to the integrated service(s) and/or components, a software folder 310 including software modules 310B, and/or a configuration folder 312.

Configuration folder 312 includes one or more of: description of the integrated service(s) 312B, a description of requirements of the service(s) 312C, and a description of capabilities of the service(s) 312D.

Service description 312B includes a component folder 314 that includes a description of software components 314B, a description of hardware components 314C, and optionally a description of human based components (i.e., manual components) 314D. Software components 314B may include links and/or descriptions of actual software components 318, for example, to allow removal of the components for installation of the modified version of the integrated service.

Service description 312B may include a description of service provider(s) 316 providing the service.

The folder structure of data structure 302 is exemplary, as other arrangements of the data and/or folders are possible.

Referring now back to FIGS. 1 and 2, at 106, the inventory description representing the components of automated home environment 201 is analyzed to identify a set of corresponding components within the selected integrated service offering of server 216, for example, by an analysis module 222 stored on and/or in communication with server 216.

Optionally, the identified subset includes components already existing within the automated home environment having different update versions than the update version offered as part of the integrated service. For example, the identified subset may include a sensor. The sensor at the automated home environment is running an update module version 1.4, while version 2.2 is offered as part of the integrated service. Alternatively or additionally, the identified subset includes one or more existing software components associated with existing hardware components of the home environment. The integrated service includes the corresponding software component and new hardware. The existing software component of the home environment may be reused with the new hardware of the integrated service offering. Alternatively or additionally, the identified subset includes one or more existing hardware components associated with offered software components that are different than existing software components. The new software version of the hardware of the integrated service offering may be installed to update the existing version of the corresponding hardware at the home environment. Alternatively or additionally, the identified subset is based on one or more existing components within an integrated calculation process. The existing components may generate a certain output (e.g., data values) which may be used as input by a new component to calculate a desired value. In another case, the new component may generate a certain output which may be used as input by the existing component to calculate the desired value. The integrated service may include a component with partial correspondence, able to directly calculate the final desired value. The modified version of the integrated offering may include the new component instead of the component with partial correspondence, which may have a lower cost. For example, the existing component calculates certain parameters based on a received heart signal. The new component of the offering detects abnormal heart rhythms. The modified version may include an alternative component, which receives the calculated certain parameters and outputs the detection of abnormal heart rhythm. The alternative component may be integrated with the existing component (instead of the new component) to achieve the same or similar outcome as provided by the new component.

Optionally, the sub-set is identified by correlating the received inventory description of the automated home environment with the inventory representation of the service offering. Optionally, the identification is based on a correlation value above a threshold that represents a degree of similarity between the respective component already existing at the home environment and the corresponding component within the integrated service offering. Correlation may be based on the modified version of the integrated service offering substantially the same functionality as the original offering unless there are conflicts which prevent the original offering being installed in the home environment. The correlation may be performed, for example, by a statistical correlation module.

Alternatively or additionally, the sub-set is identified by analyzing for interference and/or conflict between components of the service offering and existing components of the home environment. Components that would interfere with each other when both are installed are identified as correlating. For example, pulse sensors each requiring installation on the left wrist of the user, or heart rhythm analysis modules each requiring input from an electrocardiogram sensor.

Alternatively or additionally, the sub-set is identified by analyzing for similar functions between components of the service offering and existing components of the home environment. Components that provide similar functions are identified as correlating with each other, optionally even when the function is provided by different hardware and/or software designs. For example, different methods for detecting a fall of an elderly individual.

Each respective integrated service offering 220 is associated with an offering inventory that includes a representation of the description of hardware, software and optional components within the respective integrated service. The offering inventories and the received inventory description are represented using the same common data format, as described herein, for example, with reference to FIG. 3. The common format allows for the correlation to identify the sub-set of corresponding components.

The correlation using the common data format is performed independently of the vendors providing the components. The correlation may be performed, for example, when some of the components within the automated home environment are provided by one or more vendors that are different than the vendors providing the components for the offered integrated services. For example, a blood pressure monitor at the home environment offered by one vendor and a different blood pressure monitor provided by different vendor offered as part of a certain integrated service, which may operate differently and/or have different designs, are correlated as corresponding to each other. The correlation may be performed, for example, when some of the components within the automated home environment are provided by the same vendor that provides the components for the offered integrated service. In such a case, corresponding components may be presented as upgrades and/or with the option to re-use the existing components, as described herein.

Optionally, an inventory module 224 stored on and/or in communication with server 216 analyzes each respective integrated service offering 220 and automatically generates respective offering inventories. Module 224 may operate as an overlay to the service offerings provided by different vendors to generate offering inventories using a common generic data structure. Module 224 may analyze, for example, textual description of the offered components and/or the components themselves. Module 224 may analyze the service offering to identify a deployment topology for the components. The offering inventory may be automatically generated without necessarily requiring the vendor of each service offering to provide the offering inventory and/or take special measures to allow automatic generation of the offering inventory.

Optionally, at 108, a discount is calculated for the selected service offering when the service offering is provided without the identified subset of components. Alternatively or additionally, a price of the certain integrated service is calculated when certain components are offered as upgrades instead of a new component. The price of the upgrade may be presented instead of the price of the respective new component, and/or as a discount to the new component. The discount is tailored to each potential purchaser, by being calculated for each selected service offering based on the components of the automated home environment.

The discount may be calculated by a discount calculation module 226 residing on and/or in communication with server 216. The discount may be calculated based on a set of rules that define price reduction off the complete service offering 220 based on the identified set of components which are not needed. For example, the price of the system is a sum of prices of individual components, the price of the components of the identified subset is reduced from the overall calculated price for the system. For example, when the identified subset includes a sensor having an individual price is $50, the user is offered a $50 discount on the integrated service without the sensor. In another example, a standard discount may be calculated based on an estimated value of the components in the identified subset, for example, a 10% discount, a 20%, or a 50% discount.

When the identified sub-set of components includes an old version of a component installed within the home environment, and the integrated service offering includes the new version of the component, the user may be presented with the option to update the old version of the component (e.g., install new software in relation to a hardware component), or to replace the old component. The discount may be calculated for upgrading the existing component instead of purchasing the new component to replace the old component.

Certain components may be provided without charge, and/or discounted to reflect the free component. For example, software components associated with new hardware of the integrated service offering may be offered for free, to update corresponding existing components of the home environment.

The modified version of the selected integrated service, without the identified corresponding components, is presented to the user, for example, within the user interface such as the webpage. The discounted price may be presented to the user. The user may select to purchase the modified version of the selected integrated service at the discounted price.

Optionally, one or more options are presented to the user, to selectively replace some existing components, for example, replace old technology components with improved new technology components when the functions correspond but the new technology has some advantages. For example, the user may have a preexisting sensor which may be discounted from the integrated service offering, or the user may be presented with the option to purchase a new version of the sensor at the full price.

Optionally, the user is presented with different component alternatives as part of the modified version of the integrated service offering, based on the identified subset of correlated components. When the identified subset includes a component that performs a certain function (e.g., data sensing), and the service offering includes another component that performs both the certain function and another function (e.g., data sensing and data analysis), the user is presented with the option of selecting a yet different component that performs the missing function (e.g., data analysis). The cost of the component performing the missing function may be lower than the cost of the component performing both the existing and the missing functions. In another case, when the integrated service offering includes a component offering a final result (e.g., detect abnormal heart rhythm), the modified version may include an alternative component offering an intermediate result (e.g., detect abnormal heart rhythm when parameters are provided) to be integrated with existing components (e.g., provides the parameters) to achieve the same or similar final result. The alternative component providing the partial process may have a lower cost than the component provided the complete process.

Optionally, at 110, the modified version of the selected integrated service is delivered and installed within home environment 201. For example, software components may be transmitted from server 216 to home client 202 over network 218. A message may be sent from server 216 to the manual service provider to start services. Hardware components may be manually installed by a service person, triggered by a message from server 216.

Optionally, the modified integrated service is installed as a standalone sub-system within the home environment. Alternatively or additionally, the modified version is installed and integrated to use the corresponding existing components of home environment 201 (i.e., the identified set). Additional software and/or hardware components may be designed and/or provided, to link the new components of the modified integrated service with the existing components, for example, to convert between different protocols, and to act as interfaces between different devices. Alternatively or additionally, the modified integrated service is installed as a new update (e.g., firmware, software) to existing components of the home environment, with or without additional new installed components. Alternatively or additionally, the modified integrated service is installed as a new hardware component using existing software modules of the home environment. Alternatively or additionally, the modified integrated service is installed as a new software version to update the existing version of the corresponding hardware at the home environment. Alternatively or additionally, the modified integrated service is installed as a component integrated to receive input from existing components and/or provide output to existing components, to achieve a final result. The installation may include additional bridging code (and/or hardware), such as to concatenate data to as part of the integration.

A use case is now described as an example of the method of FIG. 1 and/or the system of FIG. 2. An end user has installed on a local automated home environment a certain Health Management service, called service X. The service monitors the results of the user coming from different medical devices installed within the automated home environment for an emergency. When the emergency is detected, the system alerts formal and informal caregivers of the person being monitored. At 102, the end user selects an additional service Y for purchase. At 104, the inventory components is automatically generated and provided to the server for analysis. At 106, the analysis reveals that service X correlates with most of the components of service Y, except for a subset of components that are designed to provide a feature to track the medication consumption of the user and generate an alert when the user is non-compliant with the medications. At 108, the discount for the modified version of service Y is calculated. The discounted price reflects the existing components that do not need to be purchased and/or the components that do need to be purchased, such as a pill dispenser, related software, and the human monitoring of the medication compliance. At 110 the user purchase the additional service Y, which operates together with the existing devices of service X.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant automated home environments, integrated services, hardware components, software components, and manual components will be developed and the scope of the terms automated home environments, integrated services, hardware components, software components, and manual components are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for modifying software of an integrated service, comprising:
receiving, at a central server, a selection of a certain integrated service from a plurality of integrated services, each respective integrated service including hardware and software components, each respective integrated service associated with an offering inventory representation including a description of both the hardware and software components;

transmitting, from the central server to a client of an automated home environment, a request for an inventory representation including a description of both hardware and software components included in the automated home environment;

receiving, from the client, a message including the inventory description of the automated home environment, said inventory description is automatically generated by an automatic exploration and discovery of hardware and software components installed in said automated home environment;

correlating the inventory description of the automated home environment with the certain integrated service offering inventory, to identify a subset of hardware and software components already installed within the automated home environment that correspond to hardware and software components of the certain integrated service, wherein the inventory description and the offering inventory are based on a common data format;

generating a modified version of the certain integrated service based on the identified subset, by at least one of:
excluding from said certain integrated service at least one component of said subset, and
including in said certain integrated service at least one component as an alternative to at least one component of said subset;

presenting, to the client, said modified version of the certain integrated service;

transmitting, from the server to the client, a software component of the modified version of the certain integrated service; and installing said transmitted software component and thereafter executing the modified version of the certain integrated service in the automated home environment.

2. The method of claim 1, wherein the hardware and software components installed within the automated home environment are provided by at least one vendor that is different than the at least one vendor providing the hardware and software components of the certain integrated service.

3. The method of claim 1, wherein the identifying comprises identifying the subset of hardware and software components of the certain integrated service that interfere with functionality of the correlated hardware and software components installed within the automated home environment, when the identified subset is installed within the automated home environment.

4. The method of claim 1, wherein the identifying comprises identifying the subset based on similar functionality provided by the components of the certain integrated service offering already existing in the automated home environment, based on a similarity threshold that defines a level of similarity between functions offered by the respective components.

5. The method of claim 1 further comprises:
locally installing the modified version for execution within the automated home environment using hardware and software components already installed within the automated home environment that correspond to non-purchased hardware and software components of the certain integrated service.

6. The method of claim 1, wherein the inventory description further includes a description of manual human resource based services related to the automated home environment, the offering inventory further includes a description of manual human resource based services of the certain integrated service, and the identified subset includes manual human resources of the certain integrated service already offered in relation to the automated home environment.

7. The method of claim 1, further comprising at least one of: calculating a discount off from a price of the certain integrated service, based on a set of rules, for purchase of the certain integrated service without the identified subset, and calculating a price of the certain integrated service when certain components are offered as upgrades instead of a new component.

8. A system for modifying software of an integrated service, comprising:
a central server connected to a network, the central server configured to:
receive, from a client of an automated home environment, a selection of a certain integrated service from a plurality of integrated services, each respective integrated service including hardware and software components, each respective integrated service associated with an offering inventory representation including a description of both the hardware and software components;

transmit to the client, a request for an inventory representation including a description of both hardware and software components included in the automated home environment;

receive, from the client, a message including the inventory description of the automated home environment, said inventory description is automatically generated by an automatic exploration and discovery of hardware and software components installed in said automated home environment;

analyze the inventory description of the automated home environment by correlating with the certain integrated service offering inventory, to identify a subset of hardware and software components of the certain integrated service already installed within the automated home environment;

generate a modified version of the certain integrated service based on the identified subset, by at least one of:
excluding from said certain integrated service at least one component of said subset, and
including in said certain integrated service at least one component as an alternative to at least one component of said subset;

present, to the client, said modified version of the certain integrated service;

transmit, to the client, a software component of the modified version of the certain integrated service; and install said transmitted software component and thereafter execute the modified version of the certain integrated service in the automated home environment.

9. The system of claim 8, wherein the automated home environment includes an application platform that includes a plurality of different and interconnected runtime execution environments, each runtime environment including a plurality of standalone hardware and software components.

10. The system of claim 8, wherein the modified version includes offering of upgrades to existing components instead of new components.

11. The system of claim 8, wherein the inventory description and each offering inventory are defined in a respective format for human readability and automated readability.

12. The system of claim 8, wherein the inventory description includes a distribution of the hardware and software components at different network nodes in a network of the automated home environment, and each respective offering inventory includes a deployment topology for the respective hardware and software components.

13. The system of claim 8, wherein the central server is an online store.

14. The system of claim 8, wherein the client has stored thereon a client module configured to explore the automated home environment to discover installed hardware and software, and generate the inventory description by analyzing the discovered hardware and software.

15. The system of claim 14, wherein the client module is configured to operate at a low level to discover hardware and software components that are not discoverable using standard network exploring user interfaces designed for manual use by a user.

16. The system of claim 8, wherein the central server is further configured to analyze details of each of the plurality of integrated services to automatically generate the respective offering inventory.

17. The system of claim 8, wherein the inventory description and the offering inventory represent the respective hardware and software components independently of associated vendors.

18. The system of claim 8, wherein at least one of the hardware and software components of the automated home environment is inaccessible directly to a user of the automated home environment.

19. The system of claim 8, wherein the inventory description and the offering inventory are defined by at least one member of a group consisting of: a documentation folder including documentation, a license folder including licenses, a software folder including software modules, and a configuration folder including a description of the integrated service or home installed services including components, requirements and capabilities.

20. A computer program product for component correlation of an integrated service, comprising:
  one or more non-transitory computer-readable storage mediums, and program instructions stored on at least one of the one or more storage mediums, the program instructions comprising:
  program instructions to receive, at a central server, a selection of a certain integrated service from a plurality of integrated services, each respective integrated service including hardware and software components, each respective integrated service associated with an offering inventory representation including a description of both the hardware and software components;
  program instructions to transmit, from the central server to a client of an automated home environment, a request for an inventory representation including a description of both hardware and software components included in the automated home environment;
  program instructions to receive, from the client, a message including the inventory description of the automated home environment, said inventory description is automatically generated by an automatic exploration and discovery of hardware and software components installed in said automated home environment;
  program instructions to correlate the inventory description of the automated home environment with the certain integrated service offering inventory, to identify a subset of hardware and software components already installed within the automated home environment that correspond to hardware and software components of the certain integrated service, wherein the inventory description and the offering inventory are based on a common data format;
  program instructions to generate a modified version of the certain integrated service based on the identified subset, by at least one of:
    excluding from said certain integrated service at least one component of said subset, and
    including in said certain integrated service at least one component as an alternative to at least one component of said subset;
  program instructions to present to the client, said modified version of the certain integrated service without the identified subset;
  program instructions to transmit to the client, a software component of the modified version of the certain integrated service; and
  program instructions to install said transmitted software component and thereafter execute the modified version of the certain integrated service in the automated home environment.

* * * * *